(12) United States Patent
Sendonaris

(10) Patent No.: US 7,002,946 B2
(45) Date of Patent: Feb. 21, 2006

(54) FREQUENCY DISCRIMINATOR

(75) Inventor: Andrew Sendonaris, San Jose, CA (US)

(73) Assignee: Qualcomm Inc., San Diego, CA (US)

( * ) Notice: Subject to any disclaimer, the term of this patent is extended or adjusted under 35 U.S.C. 154(b) by 922 days.

(21) Appl. No.: 09/907,096

(22) Filed: Jul. 16, 2001

(65) Prior Publication Data

US 2003/0021247 A1    Jan. 30, 2003

(51) Int. Cl.
*H04B 7/216* (2006.01)

(52) U.S. Cl. ............. 370/342; 370/320; 370/332; 370/335; 375/343; 375/344; 375/371; 455/136; 455/138; 455/182.2; 455/192.2

(58) Field of Classification Search ........... 375/316, 375/371, 343–344, 373, 376; 370/320, 335, 370/342, 441, 479, 252; 455/75, 136, 182.2, 455/192
See application file for complete search history.

(56) References Cited

U.S. PATENT DOCUMENTS

| | | | |
|---|---|---|---|
| 4,896,336 A | | 1/1990 | Henely et al. |
| 5,036,296 A | | 7/1991 | Yoshida |
| 5,732,111 A | * | 3/1998 | Walley ............ 375/344 |
| 5,799,034 A | * | 8/1998 | Walley et al. ....... 375/140 |
| 6,222,874 B1 | * | 4/2001 | Walley et al. ....... 375/149 |
| 6,304,563 B1 | * | 10/2001 | Blessent et al. ..... 370/335 |

FOREIGN PATENT DOCUMENTS

GB    2309315    7/1997

OTHER PUBLICATIONS

Hwang et al., New AFC tracking algorithms for digital DBS receiver, Consumer Electronics, Aug. 1996, IEEE Transactions on, vol.: 42, Issue: 3, pp.: 486-491.*
Zhang et al., An improved automatic frequency correction scheme for discontinuous pilot mobile communication system, May 6-9, 2001, Vehicular Technology Conference, 2001. VTC 2001 Spring. IEEE VTS 53rd, vol.: 3, pp.: 1708-1712.*
Francis D. Natali, IEEE Transactions of Communications, vol. COM. 32, No. (1984).

* cited by examiner

*Primary Examiner*—Brian Nguyen
*Assistant Examiner*—Tri H. Phan
(74) *Attorney, Agent, or Firm*—Philip R. Wadsworth; Charles D. Brown; George Pappas

(57) ABSTRACT

A cross product is determined for a received signal. A dot product is also determined for the received signal. If the cross product is greater than a predetermined threshold, the cross product is decremented by the product of the dot product multiplied by a constant value. If the cross product is less than or equal to the predetermined threshold, the cross product is incremented by the product of the dot product multiplied by the constant value. The incrementing or decrementing is continued until the frequency error approaches a minimum value.

23 Claims, 6 Drawing Sheets

FREQUENCY DISCRIMINATOR

BACKGROUND OF THE INVENTION

1. Field of the Invention

The present invention relates generally to communications. Particularly, the present invention relates to frequency discrimination in a communications environment.

2. Description of the Related Art

CDMA communications systems typically use directional antennas located in the center of a cell and broadcasting into sectors of the cell. The antennas are coupled to base stations that transmit control the cells. The cells are typically located in major metropolitan areas, along highways, and along train tracks to allow consumers to communicate both at home and while traveling.

Even though both a mobile and a base station are transmitting on a frequency that is known to each, there are factors such as multipath errors and Doppler shift in the frequency that introduce errors in the frequency that is received. For example, if a mobile is approaching a base station, the Doppler effect increases the signal's frequency as observed by the base station. If the mobile is moving away from the base station, the base station observes a signal having a frequency that is less than the frequency transmitted by the mobile. The amount of frequency shift is a function of the speed of the mobile.

Another source of frequency error is the fact that the two local oscillators (one at the base station and one at the mobile that are used for generating the "clock" signal) can never be operating at exactly the same frequency. Typically, the mobile uses a less expensive local oscillator that can introduce a frequency error of up to 10 KHz when the carrier frequency is around 2 GHz.

During communication, the base station transmits a pilot channel that is received by the mobile. The pilot channel, comprised of pilot symbols, contains no information. The mobile utilizes the pilot symbols to generate time, frequency, phase, and signal strength references.

In some systems, the mobile also transmits a pilot signal. The mobile's pilot signal is then similarly used by the receiving base station to generate time, frequency, phase, and signal strength references relative to the mobile.

In order for a base station to communicate with a mobile on a certain frequency, both need to use a frequency discriminator in a frequency-tracking loop.

FIG. 1 illustrates a typical prior art frequency-tracking loop (FTL) 100. This figure shows a signal, $\Delta f$, entering a summer 101. $\Delta f$ represents the frequency error present in an incoming signal of successive pilot symbols. The summer 101 subtracts from $\Delta f$ an initial estimate $\Delta \hat{f}$.

Frequency discriminator 105 is known and operates on the frequency error associated with successive pilot symbols. The value of each pilot symbol is herein represented by variable $y_k$. The period of each symbol $y_k$ is denoted by $T_s$.

An incoming sequence of pilot symbols are accumulated after input signal rotation to result in a residual frequency error, out of summer 101, equal to $\Delta f_{res}$. A pilot symbol $y_k$ having residual frequency error $\Delta f_{res}^k$ may be denoted as:

$$y_k = A e^{j2\pi T_s \Delta f_{res} k} + n_k$$

where $n_k$ is the additive noise corrupting the $k^{th}$ symbol and A is a complex amplitude that is a function of, among other things, the current channel attenuation. It is assumed that fading is slow enough so that successive symbols have roughly the same complex amplitude.

A time constant ($\tau$) is herein defined as the time it takes FTL 100 to converge to 1/e of an initial frequency error. A pull-in range conventionally defines a maximum initial frequency error for which FTL 100 is able to converge. A design goal is to minimize time constant $\tau$, all the while maximizing the pull-in range, to maintain the standard deviation of the residual frequency error under steady-state conditions to within desirable levels.

A loop filter L(z) 110, series coupled to the output of frequency discriminator 105, is used to adjust the time constant $\tau$, pull-in range, and standard deviation of the frequency error.

A known type of frequency discriminator 105 is a cross product discriminator, the operation of which may be expressed as $\Delta f_{res}^{cp} = \text{imag}(y_k y_{k-1}^*)$, with * denoting complex conjugation. From the above equation for $y_k$ and $\Delta f_{res}^{cp}$ we get $$\Delta f_{res}^{cp} = |A|^2 \sin(2\pi T_s \Delta f_{res}) + n,$$

with n being a noise component. Thus as $\Delta f_{res}$ approaches $1/2T_s$, the value of $\sin(2\pi T_s \Delta f_{res})$ becomes smaller, resulting in the following condition:

First, the pull-in range of the FTL 100 is smaller than a theoretical pull-in range due to the effects of noise. Second, when the initial frequency error $\Delta f$ is greater than ½ the theoretical pull-in range, FTL 100 takes a long time to converge to 1/e of the initial frequency error $\Delta f$.

SUMMARY OF THE INVENTION

The invention encompasses a process and apparatus for improved frequency discrimination. In particular, the invention provides a frequency tracking loop (FTL) providing a large effective pull-in range and fast convergence characteristics when an initial frequency error greater than ½ a theoretical pull-in range is detected.

In an embodiment, a cross product is first determined on an input to the FTL. This cross product is of the form $\text{imag}(y_k y_{k-1}^*)$, where $y_k$ is one sample or symbol of the received signal and $y_{k-1}$ is a preceding symbol. A dot product, expressed as $\text{real}(y_k y_{k-1}^*)$, is then also determined.

When the cross product is greater than a predetermined threshold, the cross product is decremented by the product of the dot product multiplied by a predetermined constant value. In a specific implementation, a predetermined threshold of value zero and a predetermined constant value in the range of 0 to 5 are selected.

Conversely, when the cross product is less than the selected predetermined threshold, the cross product is incremented by the product of the dot product multiplied by the predetermined constant value. The calculation of and incrementing and decrementing of the cross product is generated by a frequency discriminator. The output of the frequency discriminator is used to derive a residual frequency error for an incoming signal comprised of successive pilot symbols. Successive symbols are fed into the frequency discriminator and the previously derived residual frequency error used to adjust the output of the frequency discriminator that then provides a new output to the FTL.

DETAILED DESCRIPTION

A frequency discriminator characterized by the following description provides a large effective pull-in range and fast convergence in comparison to known cross-product discriminators.

In accordance with an embodiment, the frequency discriminator includes both a simple cross product discriminator and a dot product discriminator. As used above, the cross product discriminator, denoted as cp, is expressed as:

$$cp = \text{imag}(y_k y_{k-1}^*)$$

where $y_k$ is the $k^{th}$ pilot symbol in a renewed signal and $y^*_{k-1}$ is the complex conjugate of the $(k-1)^{th}$ pilot symbol.

A dot product discriminator, denoted as dp, by convention is expressed as:

$$dp = \text{real}(y_k y_{k-1}^*)$$

From the above, a frequency discriminator in accordance with an embodiment, to be derived in further detail below shall be expressed as:

$$\Delta \hat{f}^{new}_{res} = cp$$
when $(dp < \theta)$
  if $(cp > 0)$, then
    $\Delta \hat{f}^{new}_{res} = \Delta \hat{f}^{new}_{res} - \alpha \cdot dp$
  else
    $\Delta \hat{f}^{new}_{res} = \Delta \hat{f}^{new}_{res} + \alpha \cdot dp$
  end
end where $\alpha$ and $\theta$ are constants whose values are design parameters based on a desired system.

In a first embodiment, $\alpha$ is in the range of 0 to 5. For $\alpha=0$ the frequency discriminator collapses to a simple cross product discriminator. This can be seen by substituting 0 for $\alpha$ in the above expression for $\Delta f_{res}^{new}$.

In another embodiment, a is chosen to be a power of 2. This is desired in a frequency discriminator hardware-specific implementation where multiplication with $\alpha$, where $\alpha$ is a power 2, becomes a simple left shift operation.

In one embodiment, $\theta$ is in the range of a real number that is less than 0. However, other ranges for $\theta$ can be used as well.

It should be further appreciated that the frequency discriminator operation described herein may be implemented by a digital signal processor (DSP). Also, the dot product measurement may be calculated in parallel with the cross product measurement using hardware. The "if" statements can be implemented as multiplexers which use the sign bits of the cp and the dp calculation as output selectors.

Figure 2:
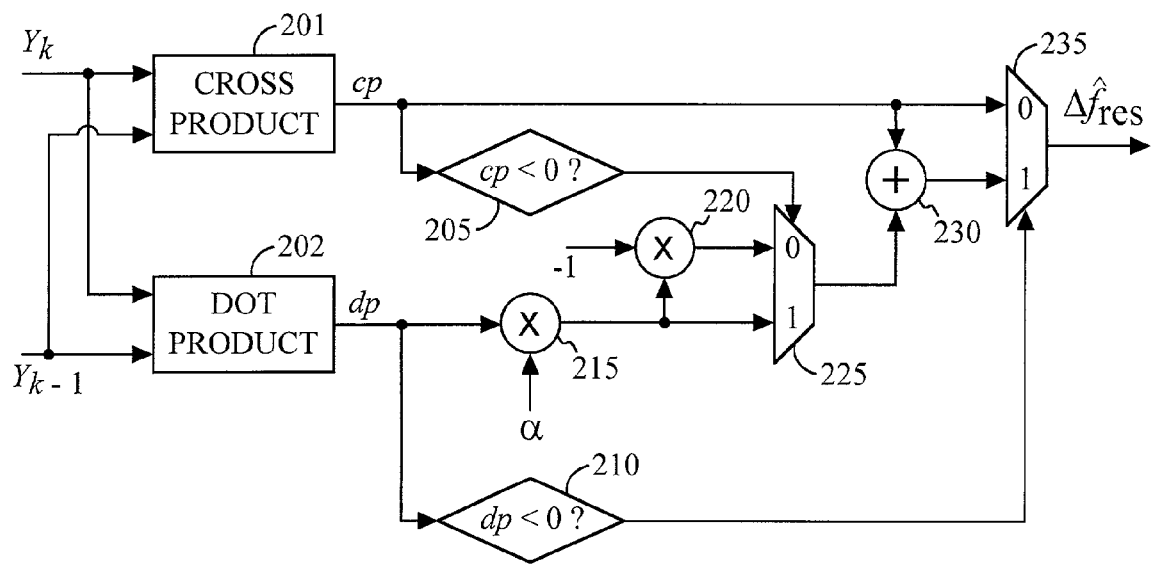
FIG. 2 shows a more detailed block diagram of the frequency discriminator in FIG. 1, constructed in accordance with the present invention.

A hardware block diagram of one embodiment of the frequency discriminator is illustrated in FIG. 2. Those skilled in the art will recognize that alternate embodiments may encompass different hardware variations to arrive at the same desired result.

The frequency discriminator of FIG. 2 includes a cross product block 201 and a dot product block 202. Both blocks 201 and 202 receive as inputs, sequential pilot symbols $y_k$ and $y_{k-1}$.

In the illustrative embodiment, the output cross product generated by cross product block 201 is a real value (as opposed to a complex value). The real value is expressed as $cp = \text{real}(y_k)\text{real}(y_{k-1}) + \text{imag}(y_k)\text{imag}(y_{k-1})$.

The output dot product block (202) also generates a real value. This value is expressed as $dp = \text{imag}(y_k)\text{real}(y_{k-1}) - \text{real}(y_k)\text{imag}(y_{k-1})$.

Output cross product (cp) is fed to the zero (0) input of the first multiplexer 235, as shown. In the present example, when $\alpha=0$, a simple cross product is output by the frequency discriminator 105.

Output dot product (dp) is fed to the zero (0) input of a first multiplier 215 where it gets multiplied by $\alpha$. The output of the first multiplier 215 is input to a second multiplexer 225. The output of the first multiplier 215 is also input to a second multiplier 220 where the sign of the $\alpha$dp signal gets inverted by multiplying the input with −1. The output of second multiplier 220 is also input to the second multiplexer 225. A select input of second multiplexer 225 is received from decision block 205.

When the output from decision block 205 is true, (i.e., cp<0), a logic high is generated and the non-inverted $\alpha$dp signal is output from multiplexer 225. When not true, i.e. cp>0, the inverted $\alpha$dp signal is output by multiplexer 225.

The second multiplexer 225 output is coupled to summer 230 and either $\alpha$dp or ($-\alpha$dp) is added to output. The output from summer 230 is input to one (1) input of first multiplexer 235.

Referring to the bottom of FIG. 2, the output of decision block 210 outputs a logic high when the condition dp<$\theta$ holds true. A logic high signal at a select input to the first multiplexer 235 will cause the first multiplexer 235 to select the output of summer 230. When the dot product is 0, the condition is false and the cross product is selected as the output to first multiplexer 235, and decision block 210 selects the 0 input of the first multiplexer 235.

It should be understood that the above-described signal selection process may be implemented in various programming languages. In one embodiment, the process can be implemented in the "C" programming language, and is expressed by:

```
if(dp<θ)
    if(cp>0)
        cp-=alpha*dp;
    else
        cp+=alpha*dp;
    end
end.
```

Figure 1:
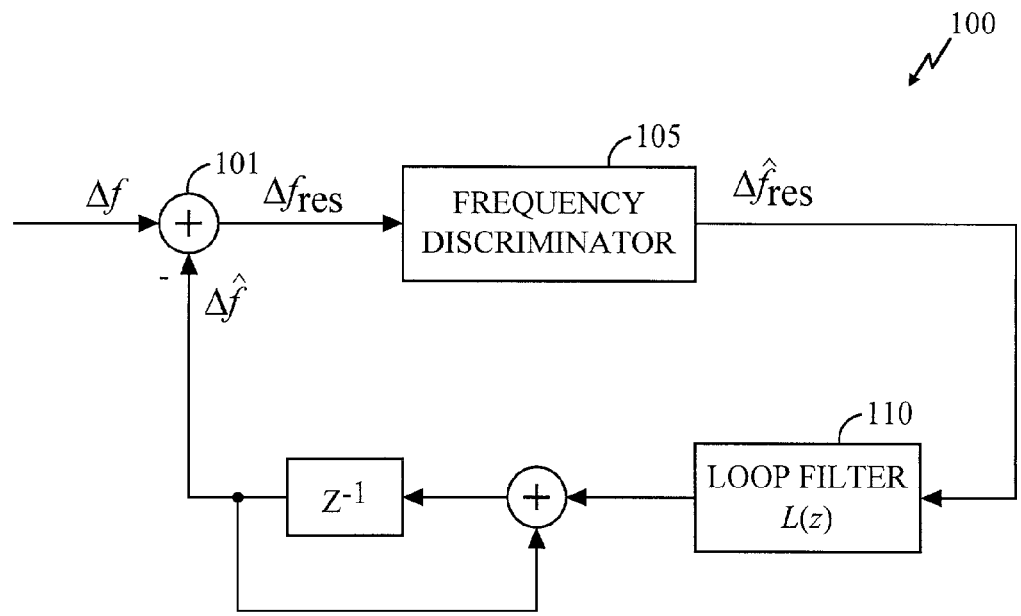
FIG. 1 is a general block diagram of a known frequency-tracking loop (FTL).

The exemplary frequency discriminator can be used in any situation that requires a low-complexity frequency estimator, such as in the frequency-tracking loop of FIG. 1. In one embodiment, the frequency discriminator is used in a FTL in a mobile communication device such as a mobile telephone. In a mobile telephone, the frequency discriminator is used on the downlink direction of the communication, i.e. the base station to mobile link.

Because the signal-to-noise ratio (SNR) of a downlink pilot is relatively high, a frequency discriminator as described above is particularly desirable.

The above frequency discriminator can also be used on the uplink direction, i.e., the mobile-to-base station link. In the uplink, the SNR of a pilot is very low. For example, a pilot SNR ($E_c/I_o$) might be as low as −38 dB. Frequency discriminators described above may be used in a low SNR uplink.

However, compensating for the low SNR to adjust lower SNR, it might be desirable to increase the accumulation length of the pilot symbols (i.e., increase $T_s$). Alternatively, low-pass filtering the cross product and the dot product will also work. Using such an embodiment changes the above equations. Factoring in a low SNR, a frequency discriminator for use in an uplink for example may be expressed as follows:

$$cp_0 = \text{imag}(y_k y^*_{k-1})$$
$$dp_0 = \text{real}(y_k y^*_{k-1})$$
$$cp = (1-\beta)cp + \beta cp_0$$
$$dp = (1-\beta)dp + \beta dp_0$$
$$\Delta \hat{f}^{new}_{res} = cp$$
if (dp < θ)
    if(cp > 0)
        $\Delta \hat{f}^{new}_{res} = \Delta \hat{f}^{new}_{res} - \alpha \cdot dp$
    else
        $\Delta \hat{f}^{new}_{res} = \Delta \hat{f}^{new}_{res} + \alpha \cdot dp$
    end
end where β is constant between 0 and 1 and the cp and dp terms are outputs of one-tap IIR filters. For very low pilot SNRs, a β closer to 0 is best. For β=1, the above expression yields the same discriminator result as the high SNR frequency discriminator expression described earlier.

Figure 10:
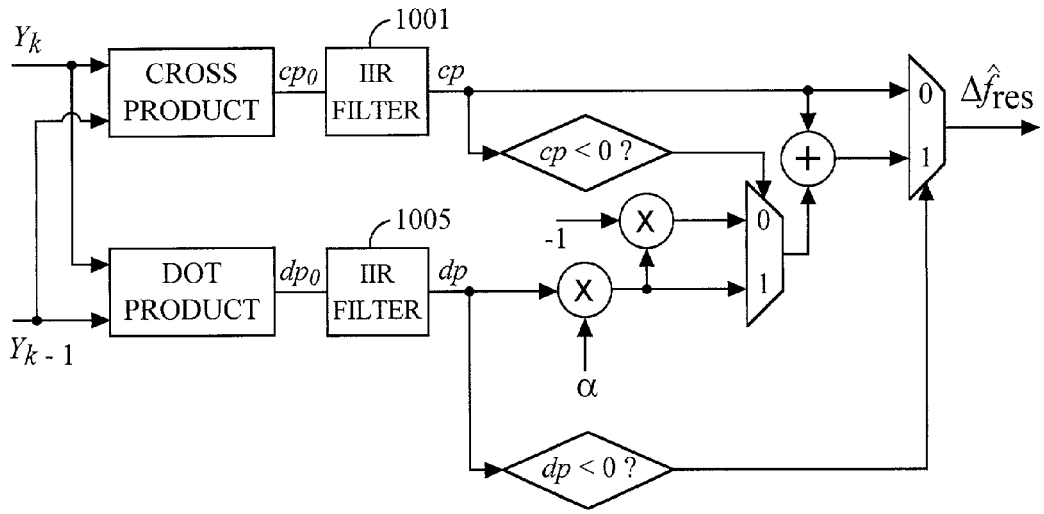
FIG. 10 shows a block diagram of a frequency discriminator for use with signals having low signal-to-noise ratios.

FIG. 10 illustrates a frequency discriminator in an embodiment of the present invention as might be found on the uplink of a communication system. This block diagram is not discussed in detail since it is substantially similar to the frequency discriminator of the downlink as illustrated in FIG. 2. However, the frequency discriminator for the uplink incorporates a one-tap IIR filter 1001 at the output of the cross product generator and a second one-tap IIR filter 1005 at the output of the dot product generator. Filters 1001 and 1005 are responsible for low-pass filtering the cross products and dot products, respectively.

Figure 3:
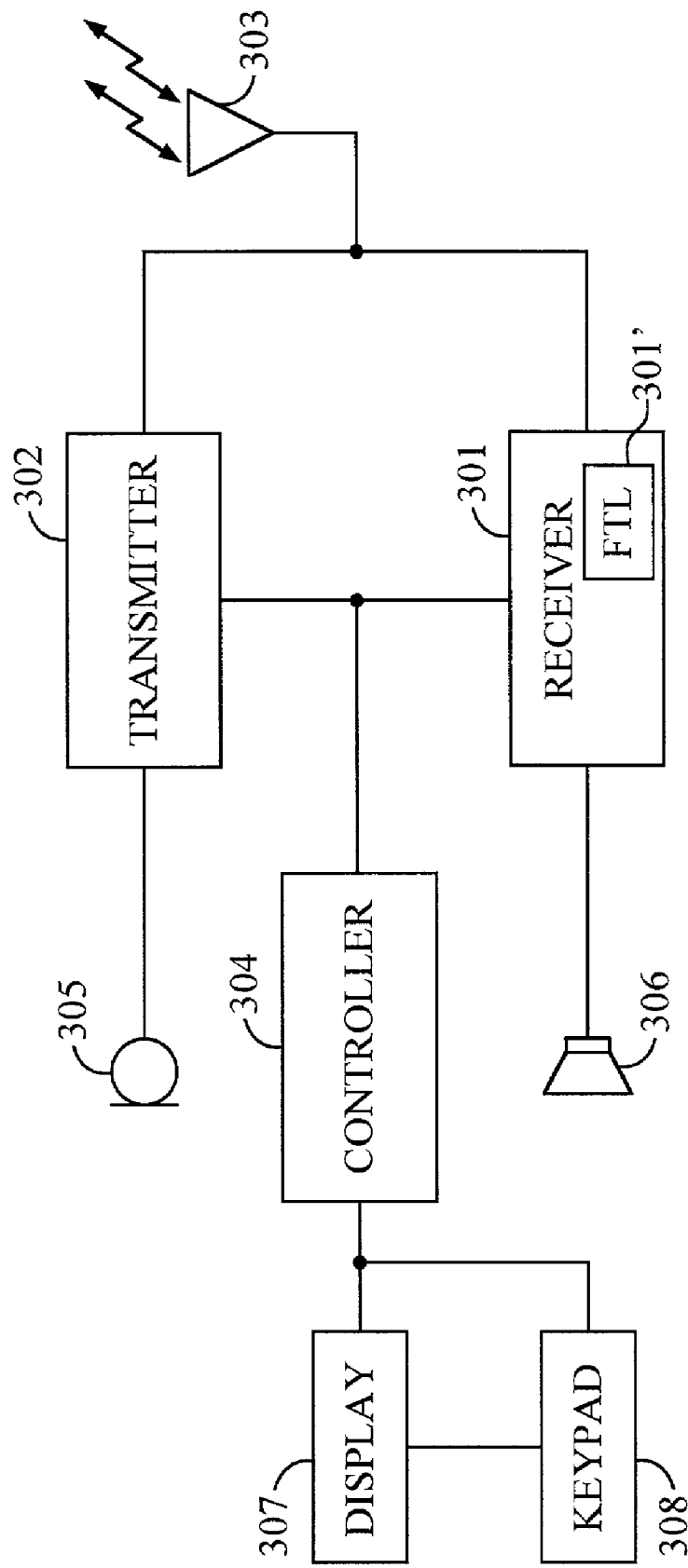
FIG. 3 shows a block diagram of a mobile station incorporating a FTL including the frequency discriminator of the present invention.

A block diagram of a mobile station incorporating the frequency discriminator of the present invention is illustrated in FIG. 3. The mobile station includes of a transmitter 302 and receiver 301 coupled to an antenna 303. Transmitter 302 modulates the aural signals from the microphone 305 for transmission. Depending on the type of communication device, transmitter 302 or like device may digitize the aural signal from a microphone 305 prior to modulation. Antenna 303 then radiates the signal to the intended destination.

Receiver 301 incorporates an FTL 301' constructed as described herein. Receiver 301 is responsible for receiving and demodulating signals received over antenna 303. FTL 301' is used within receiver 301 to lock the receiver on to a desired received frequency. In some communication devices, the receiver may be responsible for converting received digital signals into their analog equivalent for transmission by a speaker 306.

The communication device is controlled by a controller 304 such as a microprocessor or other controlling device. The controller is coupled to and controls the transmitter 302 and receiver 301 functions.

A display 307 and keypad 308 are coupled to the controller 304 for displaying information entered by a user on the keypad 308. For example, the user may enter a telephone number using the keypad 308 that is displayed on the display 307 and subsequently transmitted to a base station using the transmitter 302.

In one embodiment, the communication device is a cellular radiotelephone incorporating the frequency discriminator of the present invention. Alternate embodiments include personal digital assistants with communication capabilities and computers with communication capabilities such that they are required to lock on to a desired frequency using an FTL.

Figure 4:
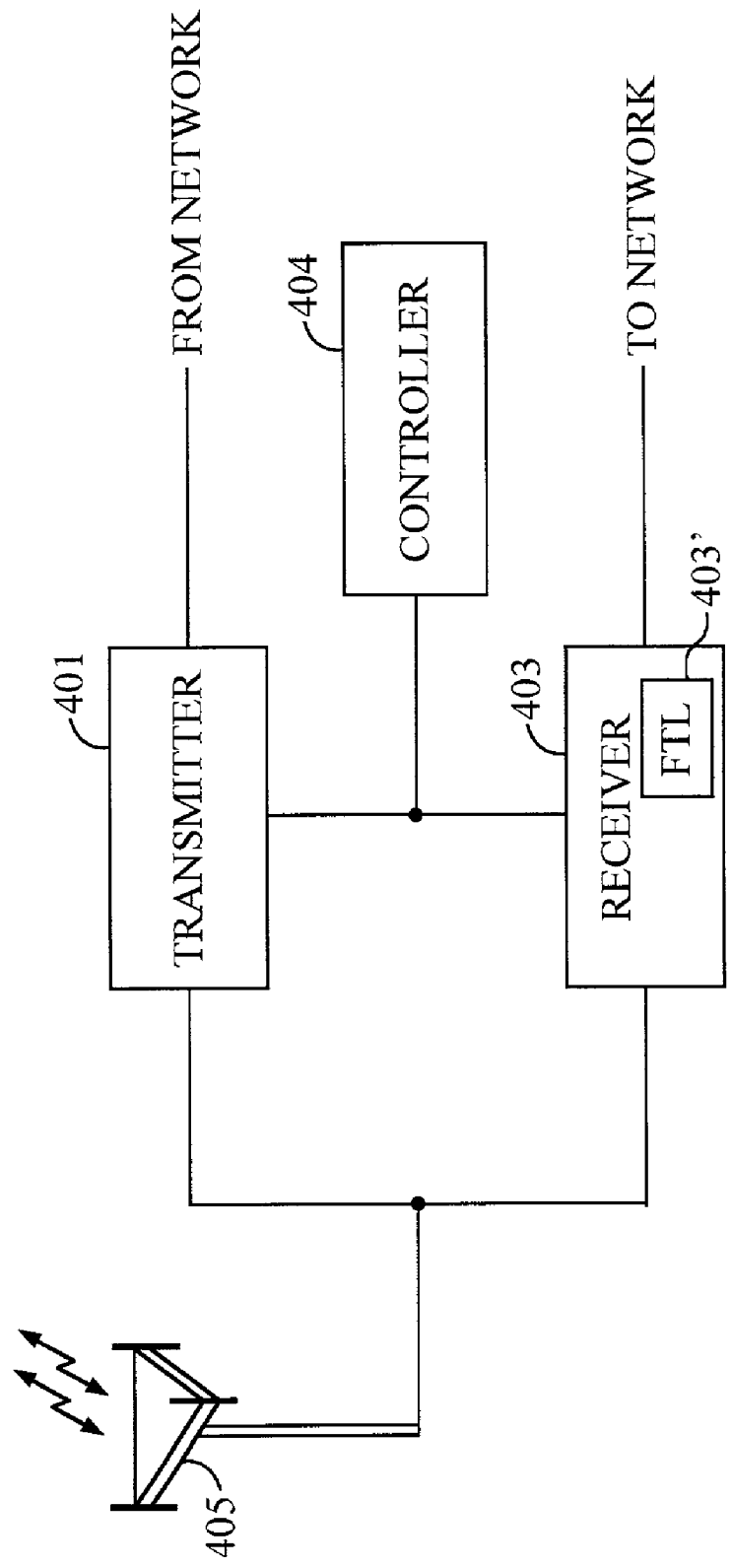
FIG. 4 shows a block diagram of a base station incorporating a FTL including the frequency discriminator of the present invention.

A block diagram of a base station incorporating the frequency discriminator as described herein is illustrated in FIG. 4. The base station is comprised of a transmitter 401 that receives a signal from the network to which the base station is coupled. The transmitter 401 modulates the signal and transmits the signal, at the proper power level, over the antenna 405.

A received signal is received by the antenna 405 and distributed to the receiver 403 having a frequency discriminator 403'. Receiver 403 tracks the frequency of the received signal using FTL 403' and demodulates any appropriate signals. The demodulated signals are sent over the network that is coupled to the base station to the appropriate destination.

In one embodiment, the base station illustrated in FIG. 4 operates in a cellular environment. Alternate embodiment base stations can be any base station that allows a mobile, wireless communication device to communicate with a fixed infrastructure.

Figure 5:
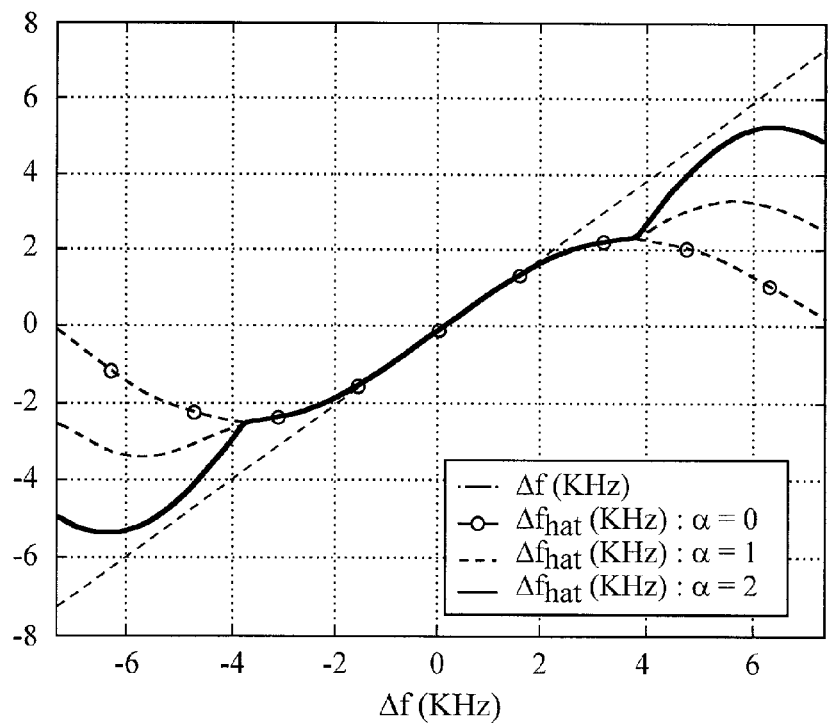
FIG. 5 shows a plot of the response of the frequency discriminator of the present invention compared to a known frequency discriminator.

FIG. 5 illustrates a plot of the frequency response of a frequency discriminator in accordance with an embodiment operation under various values of α. More specifically a plot of $\Delta f_{res}^{new}$ is shown using $T_s = {}^{256}/_{3.84 \times 10^6}$ sec. and assuming no noise. The curve corresponding to α=0 represents a regular cross-product discriminator. It can be seen from FIG. 5 that when α=2, the discriminator output closely approximates $f(2\pi T_s \Delta f_{res}) = 2\pi T_s \Delta f_{res}$ and can be assured from this that we have a very efficiently performing frequency-tracking loop. For each of the curves of FIG. 5, θ is assumed to be of value zero (0).

The output of the illustrative embodiment frequency discriminator is large for values of $\Delta f_{res}$ larger than half a pull-in range. The small value cross discriminator results of conventional solutions are ignored. The present frequency discriminator provides a larger effective pull-in range while also converging very fast when an initial frequency error is large.

FIGS. 6–9 illustrate results from simulations using a frequency discriminator as described herein. In each simulation, the pilot symbol accumulation length is assumed to be N=256 chips. This results in a $T_s = {}^{256}/_{3.84 \times 10^6}$ seconds, which is equivalent to a theoretical pull-in range of ±7.5 kHz.

Figure 6:
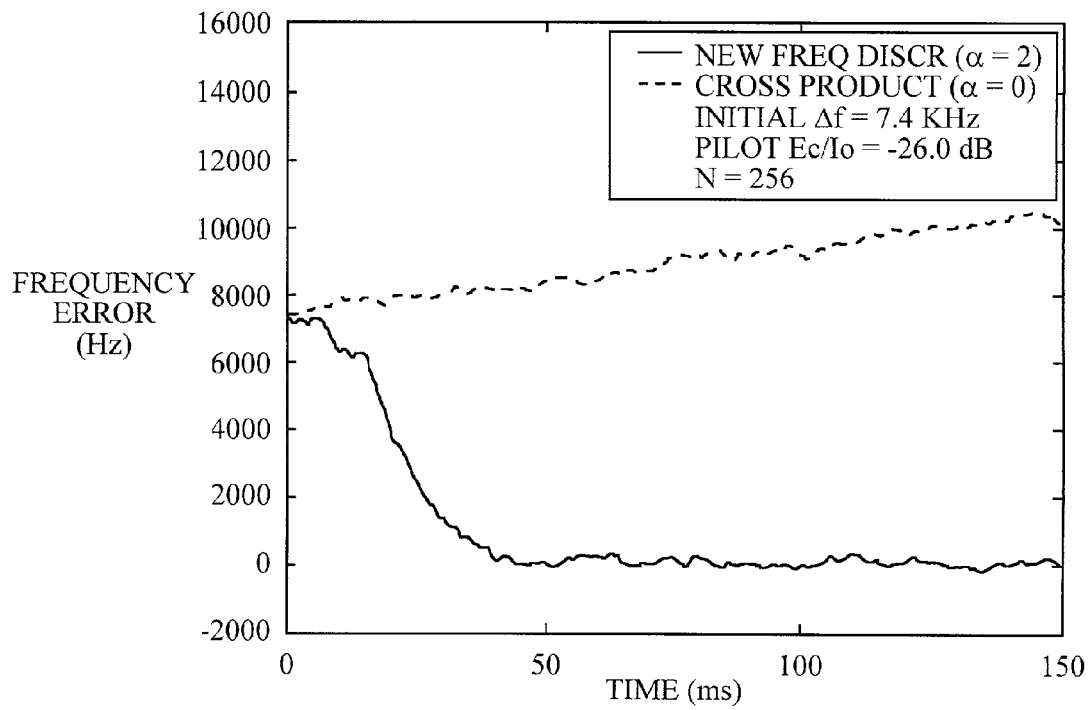
FIG. 6 shows a plot of the residual frequency error and a first initial frequency error as a function of time, assuming a first pilot strength, derived using the frequency discriminator of the present invention.

FIG. 6 illustrates a plot of residual frequency error, f, as a function of time generated by each of two different frequency discriminators, one a conventional cross product frequency discriminator and the other a frequency discriminator as described herein. An initial frequency error of 7.4 kHz and pilot SNR of $E_C/I_O = -26$ dB is assumed.

It can be seen that, with the assumed initial frequency error, a conventional cross product discriminator will cause the FTL output to diverge. On the other hand, an FTL using a frequency discriminator of a present embodiment converges relatively quickly.

Figure 7:
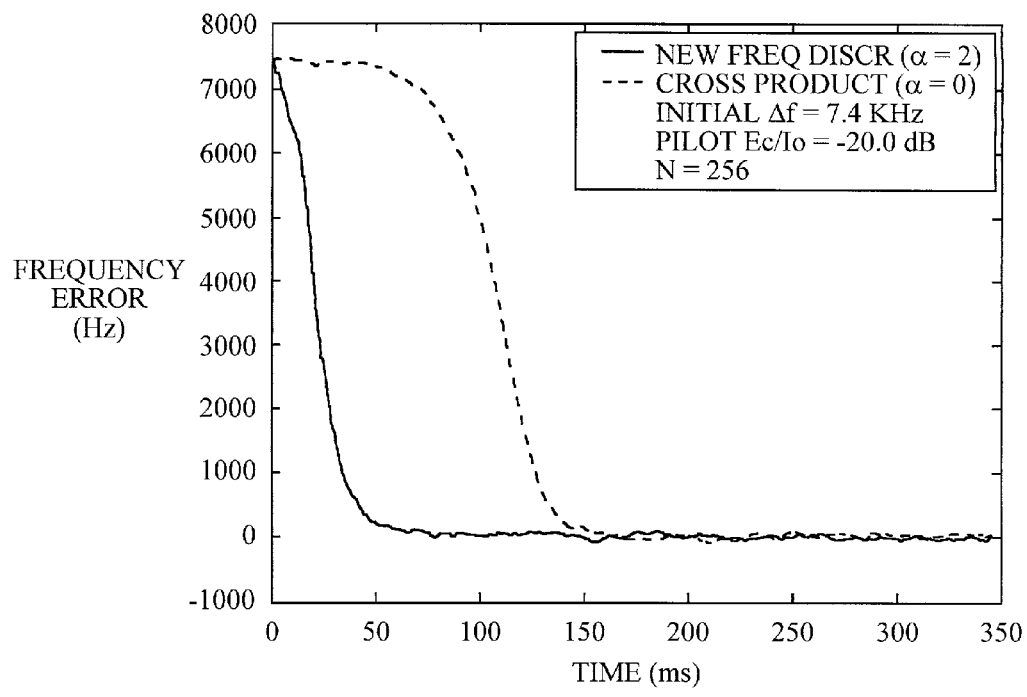
FIG. 7 shows another plot of the residual frequency error as a function of time, assuming a second pilot strength and the first initial frequency error, derived using the frequency discriminator of the present invention.

FIG. 7 illustrates what happens when the pilot strength is increased to $E_C/I_O = -20$ dB. While both present invention and prior art FTLs eventually converge, the presently disclosed frequency discriminator converges substantially faster than a cross product discriminator.

Figure 8:
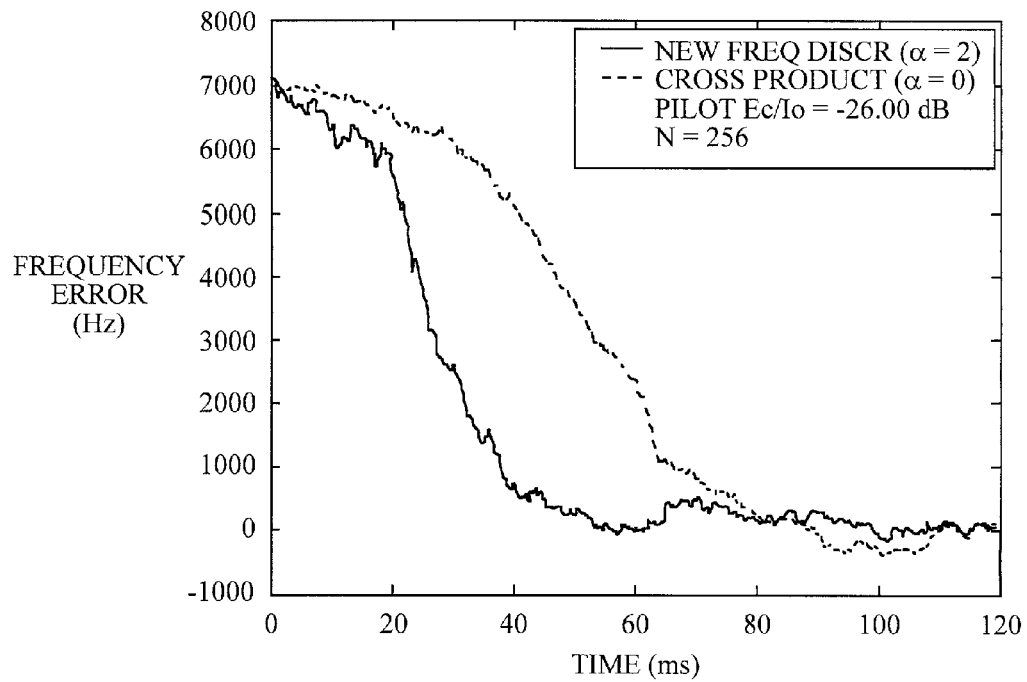
FIG. 8 shows a plot of the residual frequency error as a function of time, assuming a second initial frequency error, and the first pilot strength.
Figure 9:
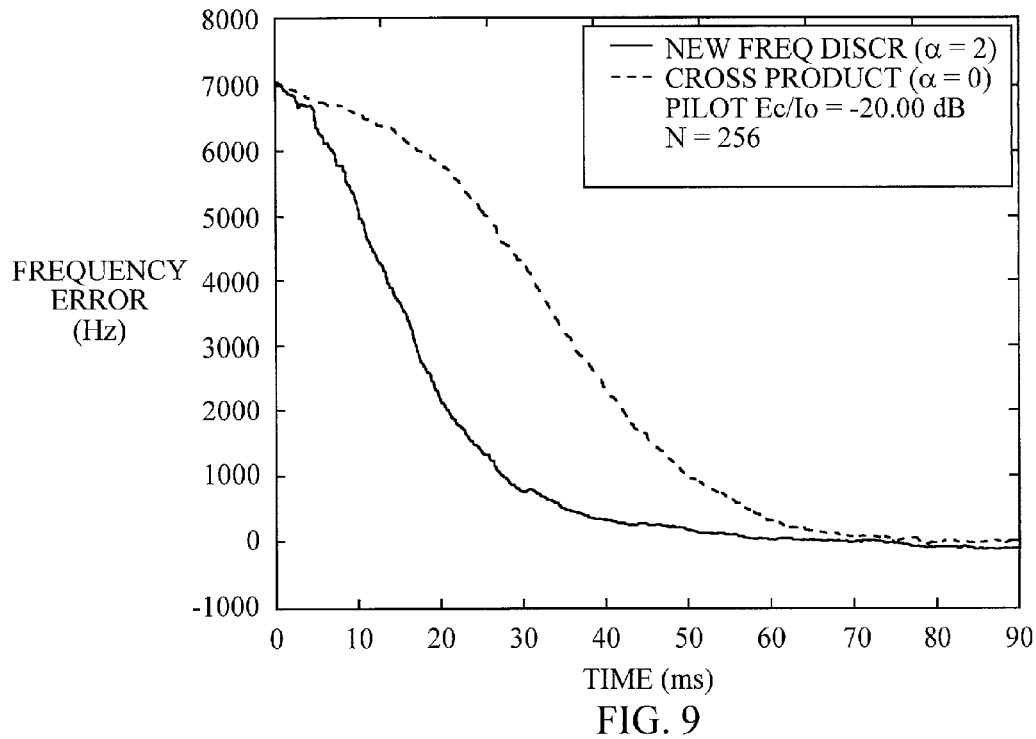
FIG. 9 shows a plot of the residual frequency error as a function of time, assuming a second/third initial frequency error, and the second pilot strength.

The plots of FIGS. 8 and 9 are similar to FIGS. 6 and 7 respectively. FIG. 8 better illustrates residual frequency error as a function of time with a pilot SNR of $E_C/I_O = -26$ dB. FIG. 9 illustrates frequency error with a pilot SNR of $E_C/I_O = -20$ dB. In both FIGS. 8 and 9, the initial frequency error is changed to 7.0 kHz. From these plots, it can be quickly seen how present embodiment frequency discriminator converges substantially faster than conventional cross product discriminators.

The frequency discriminator of the present invention is not limited to any various embodiments of the specific air interface. One implementation utilizes an embodiment in a wideband code division multiple access (WCDMA) system. One skilled in the art would readily recognize that the invention may be utilized in any number of varying air interfaces such as general CDMA system, cdma2000, FDMA, and TDMA.

In summary, the frequency discriminator of the presently described embodiment is a relatively low complexity frequency estimator that can be used in any system requiring frequency estimation. By using cross product calculations, either in isolation or in combination with dot product measurements, results in an improved solution requiring only comparisons, additions, and simple multiplications at best.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal.

In the alternative, the processor and the storage medium may reside as discrete components in a user terminal. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded with widest scope consistent with the principles and novel features disclosed herein.

The invention claimed is:

1. A method of performing frequency tracking of input signal having a frequency error, the method comprising:
   identifying a cross product and a dot product of the input signal;
   comparing the cross product relative to a predetermined threshold;
   adjusting the cross product by an adjustment amount equivalent to a first product of the dot product times a constant value on the basis of the comparison; and
   using the cross product, after adjusting by the adjustment amount, for frequency tracking of the input signal.

2. The method of claim 1, wherein the identifying the cross product comprises setting the cross product to an imaginary portion of a second product of a sample of the input signal times a complex conjugate of a previous sample of the input signal.

3. The method of claim 1, wherein the predetermined threshold is zero.

4. The method of claim 1, further comprising:
repeating the adjusting the cross product until the frequency error is decreased to a minimum value.

5. The method of claim 1, wherein the constant value is in the range of 0 to 5.

6. The method of claim 1, wherein the constant value is a power of two.

7. The method of claim 2, wherein the identifying the dot product comprises
setting the dot product to a real portion of the second product.

8. A method comprising:
identifying a cross product and a dot product of a signal comprised of a plurality of symbols;
multiplying the dot product by a constant value to generate a frequency adjustment product;
when the cross product is greater than zero, decreasing the cross product by the frequency adjustment product;
when the cross product is less than zero, increasing the cross product by the frequency adjustment product; and
using the cross product, after decreasing or increasing by the frequency adjustment product, for frequency tracking of the signal.

9. The method of claim 8, wherein the identifying the cross product comprises
calculating $\text{imag}(y_k y_{k-1}^*)$ where $y_k$ is a symbol of the plurality of symbols and imag denotes an imaginary portion of a complex value.

10. The method of claim 8, wherein the identifying the dot product comprises
calculating $\text{real}(y_k y_{k-1}^*)$ where $y_k$ is a symbol of the plurality of symbols and real denotes a real portion of a complex value.

11. The method of claim 8, further comprising:
repeating the decreasing the cross product and the increasing the cross product until frequency error of the signal approaches a minimum value.

12. The method of claim 11, wherein the minimum value is zero frequency error.

13. An apparatus comprising:
a cross product generator, coupled to an input signal, for generating a cross product of the input signal;
a dot product generator, coupled to the input signal, for generating a dot product of the input signal;
a multiplier coupled to the dot product generator for generating a product in response to the dot product and a constant value;
a first multiplexing device having a first input coupled to the product and a second input coupled to a negative of the product, the first multiplexing device selecting either the first input or the second input in response to the cross product;
a summer coupled to the cross product generator and the first multiplexing device, the summer generating a summation signal of the cross product and an output of the first multiplexing device; and
a second multiplexing device coupled to the cross product generator and the summer, the second multiplexing device selecting either the cross product or the summation signal in response to the dot product.

14. The apparatus of claim 13, further including:
a first comparator coupled to the cross product generator, the first comparator generating a first selection signal based on the cross product and a threshold value, the first selection signal coupled to the first multiplexing device; and
a second comparator coupled to the dot product generator, the second comparator generating a second selection signal based on the dot product, the second selection signal coupled to the second multiplexing device.

15. The apparatus of claim 14, wherein the threshold value is zero.

16. A mobile communications device comprising:
a receiver for demodulating an input signal that was received over a communications channel, the receiver comprising:
a cross product generator, coupled to the input signal, for generating a cross product of the input signal;
a dot product generator, coupled to the input signal, for generating a dot product of the input signal;
a multiplier coupled to the dot product generator for generating a product in response to the dot product and a constant value;
a first multiplexing device having a first input coupled to the product and a second input coupled to a negative of the product, the first multiplexing device selecting either the first input or the second input in response to the cross product;
a summer coupled to the cross product generator and the first multiplexing device, the summer generating a summation signal of the cross product and an output of the first multiplexing device; and
a second multiplexing device coupled to the cross product generator and the summer, the second multiplexing device selecting either the cross product or the summation signal in response to the dot product.

17. The mobile communications device of claim 16, further comprising:
a speaker for converting a demodulated signal to an aural signal;
a microphone for generating an output signal;
a display that displays mobile communications data; and
a controller coupled to the receiver and the display in order to control the mobile communications device.

18. The mobile communications device of claim 16, further comprising
a transmitter for transmitting a code division multiple access output signal over the communication channel.

19. The mobile communications device of claim 16, wherein the input signal is a code division multiple access signal.

20. A receiver comprising:
a cross product generator, coupled to an input signal, for generating a cross product of the input signal;
a dot product generator, coupled to the input signal, for generating a dot product of the input signal;
a first low pass filter, coupled to the cross product, for generating a filtered cross product;
a second low pass filter, coupled to the dot product, for generating a filtered dot product;
a multiplier coupled to the filtered dot product for generating an adjustment product in response to the filtered dot product and a constant value;
a first multiplexing device having a first input coupled to the adjustment product and a second input coupled to a negative of the adjustment product, the first multiplexing device selecting either the first input or the second input in response to the filtered cross product;

a summer coupled to the filtered cross product and the first multiplexing device, the summer generating a summation signal of the filtered cross product and an output of the first multiplexing device; and a second multiplexing device coupled to the first low pass filter and the summer, the second multiplexing device selecting either the filtered cross product or the summation signal in response to the filtered dot product.

21. An apparatus comprising:

means for processing a received signal having a frequency error, with a frequency error estimate, to obtain an input signal having a residual frequency error;

means for determining a cross product of the input signal;

means for determining a dot product of the input signal;

means for determining an adjustment amount based on the dot product and a predetermined value;

means for determining the cross product by the adjustment amount if the cross product is greater than a predetermined threshold;

means for incrementing the cross product by the adjustment amount if the cross product is less than or equal to the predetermined threshold; and means for using the cross product, after decrementing or incrementing by the adjustment amount, for frequency tracking of the received signal.

22. The apparatus of claim 21, further including means for filtering the cross product, after decrementing or incrementing by the adjustment amount, to generate an updated frequency error estimate.

23. An apparatus comprising:

a cross product generator, coupled to an input signal, for generating a cross product of the input signal;

a dot product generator, coupled to the input signal, for generating a dot product of the input signal;

a first low pass filter, coupled to the cross product, for generating a filtered cross product;

a second low pass filter, coupled to the dot product, for generating a filtered dot product;

a multiplier coupled to the filtered dot product for generating an adjustment product in response to the filtered dot product and a constant value;

a first multiplexing device having a first input coupled to the adjustment product and a second input coupled to a negative of the adjustment product, the first multiplexing device selecting either the first input or the second input in response to the filtered cross product;

a summer coupled to the filtered cross product and the first multiplexing device, the summer generating a summation signal of the filtered cross product and an output of the first multiplexing device; and a second multiplexing device coupled to the first low pass filter and the summer, the second multiplexing device selecting either the filtered cross product or the summation signal in response to the filtered dot product.

* * * * *